US005260222A

United States Patent [19]

Patel et al.

[11] Patent Number: 5,260,222

[45] Date of Patent: * Nov. 9, 1993

[54] DEVICE AND METHOD FOR COMPLETING A FLUIDIC CIRCUIT WHICH EMPLOYS A LIQUID EXPANDABLE PIECE OF BIBULOUS MATERIAL

[75] Inventors: Rajesh D. Patel, Fremont; Nurith Kurn; Martin Becker, both of Palo Alto; Edwin F. Ullman, Atherton, all of Calif.

[73] Assignee: Syntex (U.S.A.) Inc., Palo Alto, Calif.

[ * ] Notice: The portion of the term of this patent subsequent to Aug. 4, 2009 has been disclaimed.

[21] Appl. No.: 874,662

[22] Filed: Apr. 27, 1992

Related U.S. Application Data

[63] Continuation of Ser. No. 441,665, Nov. 27, 1989, Pat. No. 5,135,873.

[51] Int. Cl.[5] .............. G01N 1/10

[52] U.S. Cl. .............. 436/180; 436/169; 422/55; 422/56; 422/58; 422/100

[58] Field of Search .............. 422/56–58, 422/61, 100, 55; 436/161, 165, 169–170, 180, 807, 810, 514; 435/4, 805, 808, 810

[56] References Cited

U.S. PATENT DOCUMENTS

| | | | |
|---|---|---|---|
| 3,482,943 | 12/1969 | Csizmas et al. | 422/58 X |
| 4,094,647 | 6/1978 | Deutsch et al. | 23/253 |
| 4,246,339 | 1/1981 | Cole et al. | 422/102 X |
| 4,435,504 | 3/1984 | Zuk et al. | 435/7 |
| 4,700,714 | 10/1987 | Fuisz | 128/767 |
| 4,740,468 | 4/1988 | Weng et al. | 435/7 |
| 4,803,170 | 2/1989 | Stanton et al. | 436/518 |
| 4,826,759 | 5/1989 | Guire et al. | 435/4 |
| 4,839,297 | 6/1986 | Freitag et al. | 435/805 X |
| 4,857,453 | 8/1989 | Ullman et al. | 435/791 X |
| 4,861,711 | 8/1989 | Friesen et al. | 436/7 |
| 4,883,764 | 11/1989 | Kloepfer et al. | 422/58 X |

*Primary Examiner*—James C. Housel
*Assistant Examiner*—Jeffrey R. Snay
*Attorney, Agent, or Firm*—Theodore J. Leitereg

[57] ABSTRACT

Methods and devices for permitting capillary flow of liquid between two or more pieces of bibulous material which, prior to actuation, are in a non-capillary flow relationship. In particular, the device is actuated and a capillary flow relationship is initiated between the two or more pieces of bibulous material in non-capillary flow relationship by utilizing a liquid expandable piece of bibulous material.

4 Claims, 9 Drawing Sheets

DEVICE AND METHOD FOR COMPLETING A FLUIDIC CIRCUIT WHICH EMPLOYS A LIQUID EXPANDABLE PIECE OF BIBULOUS MATERIAL

This is a continuation of pending application Ser. No. 07/441,665, filed Nov. 27, 1989, now U.S. Pat. No. 5,135,873, the disclosures of which are incorporated herein by reference.

BACKGROUND OF THE INVENTION

1. Field of the Invention

The present invention is directed to devices and methods for permitting capillary flow of liquid between two or more pieces of bibulous material which, prior to actuation, are in a non-capillary flow relationship to each other. In particular, the device is actuated and a capillary flow relationship is initiated between the two or more pieces of bibulous material by utilizing a liquid expandable piece of bibulous material. When actuated by wetting, the liquid expandable piece of bibulous material initiates a capillary flow relationship between the two or more pieces of bibulous material. The methods and devices of the present invention have particular utility in conducting assays which use capillarity to transport solutions and/or samples including assays such as enzyme immunoassays, radioimmunoassays, fluorescent immunoassays, etc.

2. Related Art.

Assay devices have been described in which liquid is transported by capillarity through or transversely along a bibulous support thereby transporting reagents and samples to sites on the support and/or washing the support. Such devices have been described by Deutsch, U.S. Pat. No. 4,094,647; Zuk et al, U.S. Pat. No. 4,435,504; Weng et al, U.S. Pat. No. 4,740,468; Friesen et al, German Offenlengungschrift 3,445,816 etc.

In many of these methods, reagents can be added at more than one position on the bibulous support. In such situations, it is often desirable to cause the added reagent to migrate in only one direction along the bibulous support, to delay flow in a given direction, or to create a direction of flow that was impeded prior to the addition of the reagent. For example, it is often desirable for a solution moving along a bibulous support to automatically stop moving after a certain volume has been taken up so as to avoid the necessity to monitor the flow of solution. Subsequent to taking up a certain volume, a second solution is allowed to flow along the support. In the past, the first flow can be stopped by limiting the length of the first bibulous support and the second flow initiated by contacting one end of the first bibulous support with a solution and the other end with a second bibulous support which is dry.

Likewise, in liquid containing assay devices, a sample is added to one of the ports and liquid within the device washes the sample away from a detection zone. See, for instance, Khanna et al, U.S. patent application Ser. No. 35,562 filed Apr. 7, 1987, now U.S. Pat. No. 4,857,543, entitled "Immunoassay Devices" and which is incorporate herein in its entirety. To maximize the washing efficiency, it is desirable that upon contacting the support with the sample, the sample flows in only the direction away from the source of the wash liquid.

In both of the above cases, it is desirable to create a capillary flow relationship between two pieces of bibulous material which heretofore have been in a non-capillary flow relationship. Moreover, it would be particularly desirable to create such a capillary flow relationship automatically without mechanical means external to the device while requiring minimal operator involvement to operate.

U.S. Pat. No. 3,482,943 discloses expandable sponges useful in transporting solution to a set position on a gel suitable for conducting immunodiffusion tests. In this reference, the solution transported by the sponge is allowed to diffuse into the gel which, in order to conduct the immunodiffusion, is by necessity a wet gel. Accordingly, no capillary flow relationship between the expandable sponge and the gel is established by this device.

U.S. Pat. No. 4,246,339 discloses a device having an upper portion and a lower portion. The upper portion has a plurality of wells wherein the bottom of each well is fitted with a membrane layer capable of transporting liquid. The bottom portion of the device contains absorbent material. Between the top and bottom portions is a compressible spacer. This device allows a liquid sample to be added to the wells which may optionally be impregnated with an antibody. After a set incubation period, pressure is placed on the top portion which because of the compressible spacer, allows the bottom of each of the wells to contact the absorbent material whereupon the liquid in the wells is transferred to the absorbent material. After liquid transfer, the pressure is removed and contact between the bottom of the wells and the absorbent material is broken. Thereupon, additional liquid may be added to the wells. In this device, care must be taken to insure that the bottom of all of the wells come into contact with the absorbent material for a sufficient period of time to remove the liquid. In particular, if one or more of the wells does not contact the absorbent material, then the liquid in that well will not be removed. Moreover, if one or more of the wells does not contact the absorbent material for a sufficient period of time, then not all of the liquid in that well will be removed. In any case, a high level of operator care is required to ensure the proper operation of this device.

U.S. Ser. No. 35,562 filed Apr. 7, 1987 entitled "Immunoassay Devices" discloses a device for conducting an assay method. The device comprises a housing having in one portion thereof a breakable capsule and in another portion a piece of bibulous material attached to an absorbent pad. However, this reference neither teaches or suggests the use of a liquid expandable piece of bibulous material which, when desired, can initiate a capillary flow relationship with another piece of bibulous material.

European Patent Application Publication No. 0 146 691 discloses an air bleed passage in a liquid sampling needle which is formed between a housing and a sleeve and into which is added a solid compacted material which swells on contact with liquid. As the liquid sample is drawn into the needle, air can escape via the air bleed until the air bleed is contacted with liquid whereupon it expands and forms a liquid impermeable membrane.

U.S. Pat. No. 4,700,741 discloses a urine collecting device which contains an expandable sponge in a compartment which permits the collection of a predetermined quantity of urine by limiting expansion of the sponge within the compartment.

Canadian Patent No. 1,185,882 discloses porous hydrophilic, non-gel-forming swellable polymers as self-drawing fluid reservoirs with a very high and uniform absorption and release of fluid in a chromatographic quick-test device.

U.S. Pat. No. 4,826,759 describes apparatuses and methods, which can be used in the field (i.e., outside the laboratory environment) to determine qualitatively and at least semiquantitatively the presence or absence of minute quantities of ligand. The apparatus can be in the form of a strip comprising a support means provided with a groove intermediate its ends forming a crease line upon which the strip can be folded upon itself with bibulous elements and spaced from the crease line and arranged so that when the strip is folded upon itself the bibulous elements become aligned with each other and come into liquid contact.

U.S. Pat. No. 4,803,170 discusses an immunoassay device including one or more reaction chambers, each adapted to receive and retain a volume of test fluid in fluid communication with nonoverlapping first, second, and third reagent-bearing surfaces. To the first surface is reversibly bound an analyte conjugate: analyte component conjugated to one or more components, termed ligand/marker, that serve ligand and marker functions as described herein. Analyte binding partner is immobilized on the second surface, and ligand/marker binding partner is immobilized on the third surface. The reaction chamber is preferably configured to receive and direct the test fluid sequentially past the first, second, and third reagent surfaces. In use, analyte conjugate solubilized from the first surface competes with any analyte in the test fluid for analyte binding partner sites on the second surface. Excess analyte conjugate becomes sequestered on the third surface, where the marker activity is read to indicate analyte presence and concentration in the test fluid. A test kit includes the immunoassay device in combination with comparative test results.

Accordingly, there is a need for a device for creating a capillary flow relationship between two or more pieces of bibulous material which in an unactuated state are in a non-capillary flow relationship, which device requires minimal operator involvement to operate.

SUMMARY OF THE INVENTION

The present invention is directed to devices and methods for permitting capillary flow of liquid through two or more pieces of bibulous material which are in a non-capillary flow relationship. In particular, in one of its device aspects, the present invention is directed to a device for permitting capillary flow of liquid between two or more pieces of bibulous material which prior to actuation are in a non-capillary flow relationship to each other which comprises (a) a liquid expandable piece of bibulous material; and (b) two or more pieces of bibulous material in a non-capillary flow relationship to each other with the proviso that one of the pieces of bibulous material can be the liquid expandable piece of bibulous material of (a) above.

In another of its device aspects, the present invention is directed toward a device for permitting capillary flow of a liquid between two or more pieces of bibulous material which prior to actuation are in a non-capillary flow relationship to each other which comprises (a) a housing have a compressible member confined therein; (b) a liquid expandable piece of bibulous material within the housing; and (c) two or more pieces of bibulous material in a non-capillary flow relationship with each other and with the liquid expandable piece of bibulous material. One or more of the liquid expandable pieces of bibulous material and the two or more pieces of bibulous material can be affixed to the compressible member.

In one of its method aspects the present invention is directed to a method for creating a capillary flow relationship between two or more pieces of bibulous material which prior to actuation are in a non-capillary flow relationship to each other. The method comprises the step of contacting a liquid expandable piece of bibulous material with a sufficient quantity of a liquid to wet the liquid expandable piece of bibulous material. The liquid expandable piece of bibulous material is in close juxtaposition with two or more pieces of bibulous material and the wetting of the liquid expandable piece of bibulous material thereby initiates the capillary flow relationship.

In one of its method aspects, the present invention is directed toward a method for creating a capillary flow relationship between two or more pieces of bibulous material which prior to actuation are in a non-capillary flow relationship to each other which comprises (a) providing a device which comprises (i) two or more pieces of bibulous material in a non-capillary flow relationship to each other; (ii) a liquid expandable piece of bibulous material which when actuated by wetting initiates a capillary flow relationship between the two or more pieces of bibulous material with the proviso that the liquid expandable piece of bibulous material can be one of the pieces of bibulous material of (i) above; and (b) contacting the liquid expandable piece of bibulous material with a sufficient quantity of a liquid to wet the liquid expandable piece of bibulous material.

In another method aspect, the present invention is directed to a method for creating a capillary flow relationship between two or more pieces of bibulous material which prior to actuation are in a non-capillary flow relationship to each other which comprises (a) providing a device which comprises (i) a housing have a compressible member confined therein; and (ii) two or more pieces of bibulous material affixed to the compressible member in a non-capillary flow relationship to each other; and (iii) a liquid expandable piece of bibulous material within the housing which is in a non-capillary flow relationship with the two or more pieces of bibulous material and which when actuated by wetting initiates a capillary flow relationship between the two or more pieces of bibulous material; and (b) contacting the liquid expandable piece of bibulous material with a sufficient quantity of a liquid to wet the liquid expandable piece of bibulous material.

DETAILED DESCRIPTION OF THE INVENTION

Figure 1:
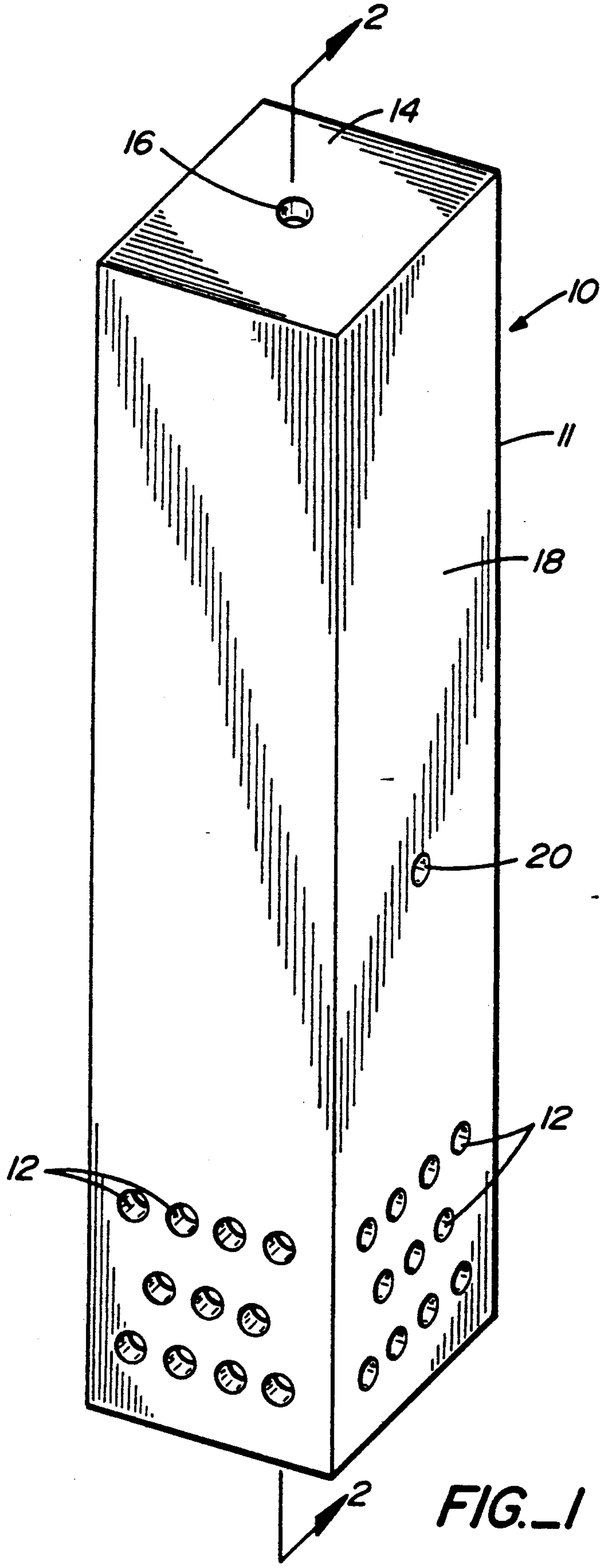
FIG. 1 is a perspective view of one embodiment of this invention.

Devices are provided which permit the formation of a capillary flow relationship between pieces of bibulous material. In particular, the devices of the present invention are useful for creating a capillary flow relationship between two or more pieces of bibulous material which theretofore were in a non-capillary flow relationship to each other.

The devices of the present invention are adaptable to a wide variety of analytical uses which require a capillary flow relationship between two or more pieces of bibulous materials which prior to actuation, were in a non-capillary flow relationship. The devices of the present invention are particularly suited for use in conjunction with chromatographic methods, particularly those providing assays for biologically significant analytes. The devices and methods of the present invention are particularly suited for clinical assay methods including immunoassays such as enzyme immunoassays, radioimmunoassays, fluorescent immunoassays, etc.

Before proceeding further with the description of the specific embodiments of the present invention, a number of terms will be defined.

Bibulous material—a porous material having pores of at least 0.1μ, preferably at least 1.0μ, which is susceptible to traversal by a liquid medium, frequently an aqueous medium, in response to capillary force. Such materials are generally hydrophilic or hydrophobic depending on whether the liquid medium is polar or non-polar, respectively, or are capable of being rendered hydrophilic or hydrophobic and include inorganic powders such as silica, magnesium sulfate, and alumina; natural polymeric materials, particularly cellulosic materials and materials derived from cellulose, such as fiber containing papers, e.g., filter paper, chromatographic paper, etc.; synthetic or modified naturally occurring polymers, such as polystyrene, polyethylene, nitrocellulose, cellulose acetate, poly(vinyl chloride), polyacrylamide, cross-linked dextran, agarose, polyacrylate, etc.; either used by themselves or in conjunction with other materials; ceramic materials; and the like. The bibulous material can be attached to a support. On the other hand, the bibulous material may provide its own support. The bibulous material may be polyfunctional or be capable of being polyfunctionalized.

The pieces of bibulous material can be a single structure such as a sheet cut into strips or it can be several strips or particulate material bound to a support or solid surface such as found, for example, in thin-layer chromatography and may have an absorbent pad either as an integral part or in liquid contact. The piece of bibulous material can be comprised of several segments, one or more being an absorbent pad, bound to a support. The piece of bibulous material can also be a sheet having lanes thereon or capable of spotting to induce lane formation, wherein a separate assay can be conducted in each lane. The absorbent pad may be any hydrophilic bibulous material such as paper, sponge, felt, porous polymers and the like. The piece of bibulous material can have a rectangular, circular, oval triangonal or other shape provided that there is at least one direction of traversal of a liquid test solution by capillary migration. In the following discussion, strips of bibulous material will be described by way of illustration and not limitation.

The support for the bibulous material, where a support is desired or necessary, will normally be insoluble in the fluid medium, non-porous, and rigid and usually will be of the same length and width as the bibulous strip but may be larger or smaller. A wide variety of organic and inorganic materials, both natural and synthetic, and combinations thereof, may be employed provided only that the support does not interfere with the capillary action of the strip, or, in the case where the bibulous material is used in an assay, non-specifically bind assay components, or interfere with the signal produced by the assay. Illustrative polymers include polyethylene, polypropylene, poly(4-methylbutene), polystyrene, polymethacrylate, poly(ethylene terephthalate), nylon, poly(vinyl butyrate), glass, ceramics, metals, and the like.

The two or more pieces of bibulous material used in the present invention need not be comprised of the same bibulous substance. For example, when two pieces of bibulous material are employed, the first piece of bibulous material can be comprised of silica whereas the second piece of bibulous material can be comprised of alumina. However, in a preferred embodiment, all of the pieces of bibulous material are comprised of the same bibulous substance.

Liquid expandable piece of bibulous material—a piece of bibulous material which upon exposure to liquid expands in size as compared to its compressed dry state. Normally, a compressed dry state of such materials is obtained by first wetting the material, then compressing it, and then drying the material while maintaining the compression. Other materials, particularly swellable polymers, naturally swell when wet and shrink when dried. Preferably, upon exposure to liquid, the liquid expandable piece of bibulous material will expand its size by at least 10%; more preferably by at least 50%; and even more preferably by between 50% and 200%. All that is required is that the liquid expandable piece of bibulous material expand a sufficient distance so as to create a capillary flow relationship between two pieces of bibulous material which theretofore were in a non-capillary flow relationship.

Such materials may be hydrophilic or hydrophobic depending on the fluid medium or are capable of being rendered hydrophilic or hydrophobic and include, for example, cellulosic, rubber, polyurethane, and natural sponges, fibers or papers, swellable polymers, etc. The liquid expandable piece of bibulous material may have fibers, woven fabrics, or other materials included therein provided that such other materials do not alter either the bibulous or liquid expandable nature of these pieces. Where the material is not intrinsically expandable upon wetting, it may be caused to be expandable, for example, by compressing the material while saturated with a solution of a solute and drying the material in the compressed form wherein the residual solute serves to prevent reexpansion of the dry material until the solute is resolubilized by wetting. The solutes will frequently be salts, particularly polycationic or polyanionic salts such as sulfates, polybrene, polyacrylate, etc. Additionally, carbohydrates, proteins, synthetic polymers and a wide variety of other compounds can be used to prevent reexpansion of the dry materials. The liquid expandable pieces of bibulous material can be attached to a support. On the other hand, the bibulous material may provide its own support. When a support is used, the support will normally be insoluble in the liquid medium, non-porous, and rigid and of similar or different dimensions as the liquid expandable piece of bibulous material. A wide variety of organic and inorganic materials, both natural and synthetic, and combinations thereof, may be employed provided only that the support does not interfere with either the capillary action or the expansion of the liquid expandable piece of bibulous material. Preferably, the liquid expandable piece of bibulous material will expand preferentially in one direction, i.e., the height will increase at a much greater rate than either the length or the width. Preferred liquid expandable pieces of bibulous material are compressed regenerated cellulose sponges which when wet tend to expand in the direction of compression. Preferably, in its unactuated state, liquid expandable piece of bibulous material is completely dry. Liquids that may be used to expand the materials can be organic or inorganic, usually solvents, and preferably polar solvents, most commonly, aqueous solvents including 0.01–40% of polar organic solvents such as dimethylformamide, dioxane, dimethyl sulfoxide, glycerol, dimethoxyethane, ethanol, methanol and the like.

Non-capillary flow relationship—two pieces of bibulous material are in a non-capillary flow relationship when liquid is unable to move by capillarity, i.e., capillary migration, from the first piece to the second piece of bibulous material. One manner of creating a non-capillary flow relationship between two pieces of bibulous material is to prevent any contact between the pieces. On the other hand, the two pieces may be in contact with each other but capillary flow between the pieces may be prevent by a physical or chemical barrier. In this case, these two pieces are in a non-capillary flow relationship to each other.

Capillary flow relationship—two pieces of bibulous material are in a capillary flow relationship when liquid is able to move by capillarity, i.e., capillary migration, from one piece to the other piece of bibulous material. One manner of creating a capillary flow relationship between two pieces of bibulous material is to allow contact between portions of the pieces which allow capillary flow from one piece to the other. Another manner of creating a capillary flow relationship between two pieces is to utilize a third piece of bibulous material which contacts both the first and second piece of bibulous material so as to complete a fluidic circuit among all three pieces of bibulous material.

Volume element—the portion of the device of the present invention capable of retaining a volume of liquid. The volume element is generally a chamber having side and bottom walls capable of holding liquid. Generally, the volume element will be capable of retaining a sufficient amount of liquid so as to be able to wet the liquid expandable piece of bibulous material. Preferably, the volume element will be capable of retaining at from about 20 μl to 5 ml of liquid, usually from about 100 μl to 2 ml, and preferably, from about 0.5 to 1.5 ml. In one embodiment, contained within the volume element is a breakable capsule which contains a set amount of liquid. When the capsule is broken, the contents of the capsule are released into the volume element. In this manner, a predetermined specified amount of liquid is added to the volume element at the exact point in time when it is required. Preferably, the breakable capsule contains some or all of the reagents (including wash reagents) require for the assay or test.

Compressible member—a pliable member that is deformed by pressure produced by expansion of the expandable piece of bibulous material and may be one of the pieces of bibulous material. In one embodiment, the compressible member has at least two arms extending from a central shoulder and running substantially parallel to each other wherein at least one of the arms is capable of being compressed toward the other arm when pressure is applied on that arm along an axis running substantially perpendicular to and toward the other arm. The shoulder of the compressible member is comprised of a flexible material such as a semi-rigid plastic or a pliable metal which permits at least one of the arms of the compressible member to be susceptible to compression (in the direction of the other arm) by applied pressure. Generally, the flexible material should be sufficiently pliable so as to result in compression of at least one of the arms by the pressure resulting from the expansion of a liquid expandable piece of bibulous material. In general, the two or more pieces of bibulous material as well as the liquid expandable piece of bibulous material are place on the arms of the compressible members in such a manner so as to result in the formation of a capillary flow relationship between the two or more pieces when the arms are compressed by the expansion of the liquid expandable piece of bibulous material. In turn, the liquid expandable piece of bibulous material is expanded by exposing this piece to a sufficient amount of liquid so as to wet it.

Referring now to the drawings, FIG. 1 is a perspective view of one embodiment of this invention. In FIG. 1, device 10 is encased by housing 11 which in turn has ports 12 which allow liquid (not shown) to enter the bottom of device 10. On top wall 14 of housing 11 is port 16 which allows air to escape the interior of device 10 when liquid enters through portals 12. Wall 18 has a port or mark 20 which aligns with or marks the exterior of wall 18 adjacent to liquid expandable piece of bibulous material 22 (shown in FIGS. 2A and 2B).

Figure 2A:
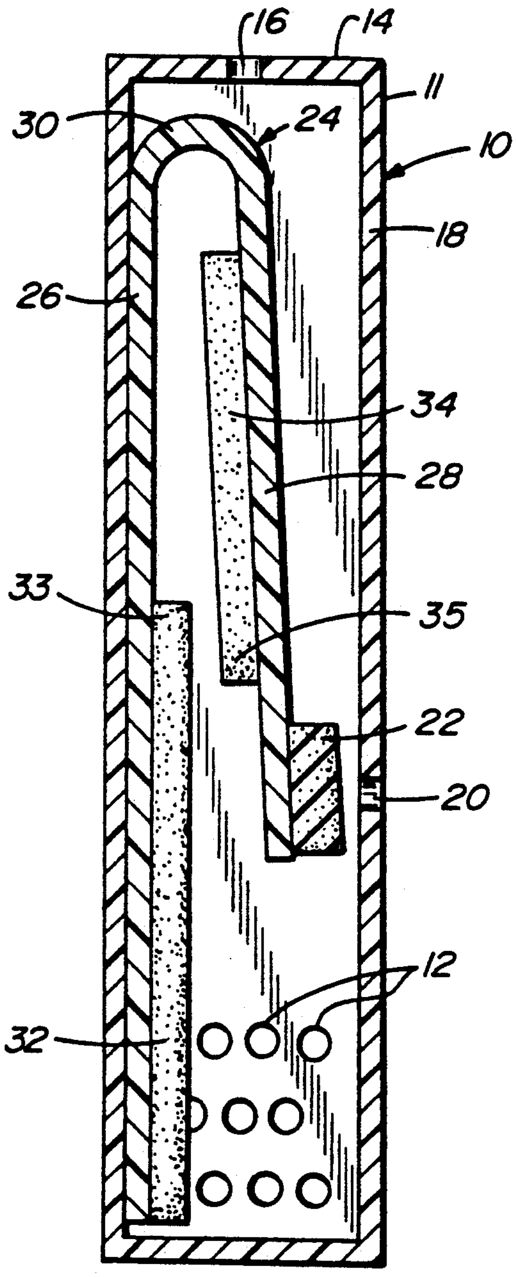
FIG. 2A is a cross-sectional view of the embodiment of FIG. 1 taken along lines 2—2 of FIG. 1 and illustrates this embodiment in its unactuated state.

FIG. 2A illustrates in cross-section the interior of device 10 in its unactuated state. Device 10 contains a compressible member 24 having two arms 26 and 28 attached through shoulder 30. The position of arm 26 is preferably fixed within device 10 so that upon expansion of the liquid expandable piece of bibulous material, compressible member 24 will not move within device 10. This can be accomplished, for example, by fixing arm 26 to either the bottom or side wall of device 10. Attached to the interior of arm 26 is a first piece of bibulous material 32 and attached to the interior of arm 28 is a second piece of bibulous material 34. First and second pieces of bibulous material 32 and 34 have adjacent portions 33 and 35 respectively. Attached to the exterior of arm 28 is a liquid expandable piece of bibulous material 22. Liquid expandable piece of bibulous material 22 is attached to the exterior of arm 28 at a point aligned with port or mark 20. Alternatively, liquid expandable piece of bibulous material 22 could be attached to interior of wall 18 at a point aligned with port or mark 20.

Figure 2B:
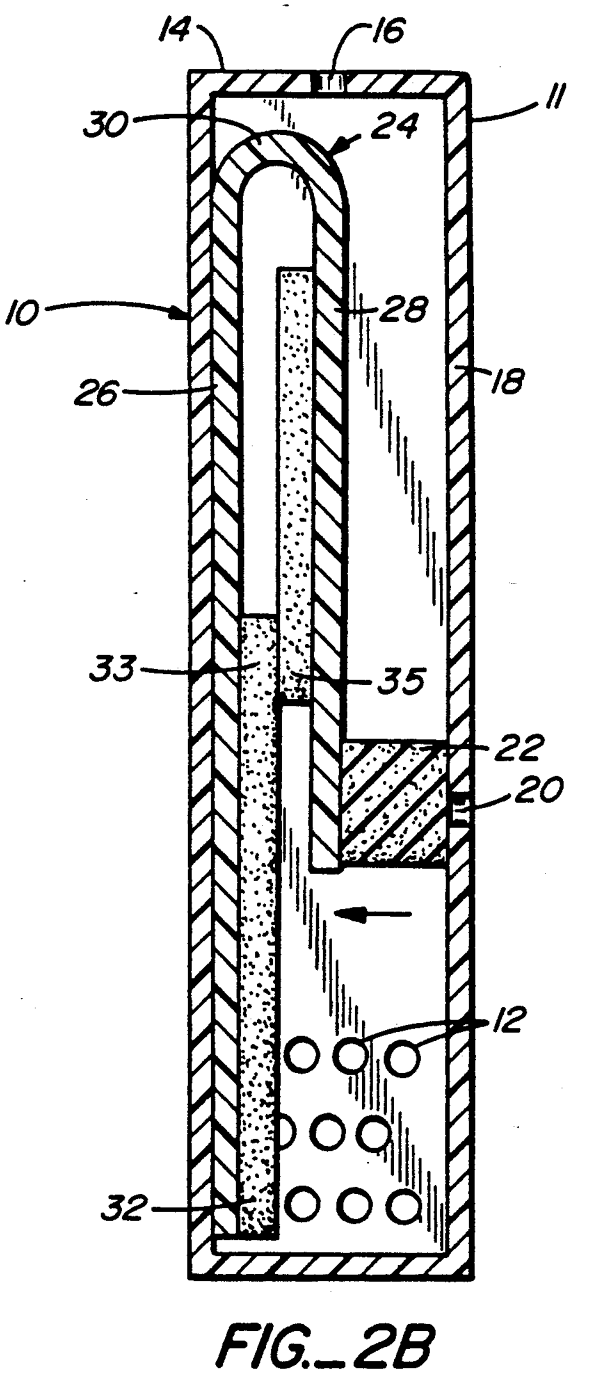
FIG. 2B is a cross-sectional view illustrating the device depicted in FIG. 2A in its actuated state.

FIG. 2B illustrates in cross-section the interior of device 10 in its actuated state. As shown in this figure, device 10 is actuated by expansion of the liquid expandable piece of bibulous material 22. When the liquid expandable piece of bibulous material 22 expands, the confinement of compressible member 24 in housing 11 results in compression of arm 28 against arm 26 through shoulder 30 which in turn results in adjacent portion 33 of first piece of bibulous material 32 contacting adjacent portion 35 of second piece of bibulous material 34 and thereby creating a capillary flow relationship between these two pieces. Liquid expandable piece of bibulous material 22 is actuated by wetting which in turn can be accomplished by allowing the liquid level in device 10 to rise to mark or port 22. Alternatively, the liquid required to wet liquid expandable piece of bibulous material 22 can be applied or injected through port 20 by, for example, a pipette. In a preferred embodiment, device 10 is placed in a liquid solution, generally an aqueous liquid solution, to a level no higher than the height of ports 12. The solution is allowed to traverse by capillarity the entire length of the first piece of bibulous material 32. Afterwards, when desired, device 10 can be placed in a second solution, generally an aqueous solution, and device 10 can either be lowered into the solution to a level equal to mark 20 which then actuates the liquid expandable piece of bibulous material. Alternatively, device 10 is placed in a second solution to a level no higher than ports 12 and the requisite amount of liquid is applied to the liquid expandable piece of bibulous material 22 so as to result in expansion of this piece and completion of the fluidic circuit. In either case, upon completion of the fluidic circuit, a capillary flow relationship exists between the first and second pieces of bibulous material, 32 and 34.

Figure 3A:
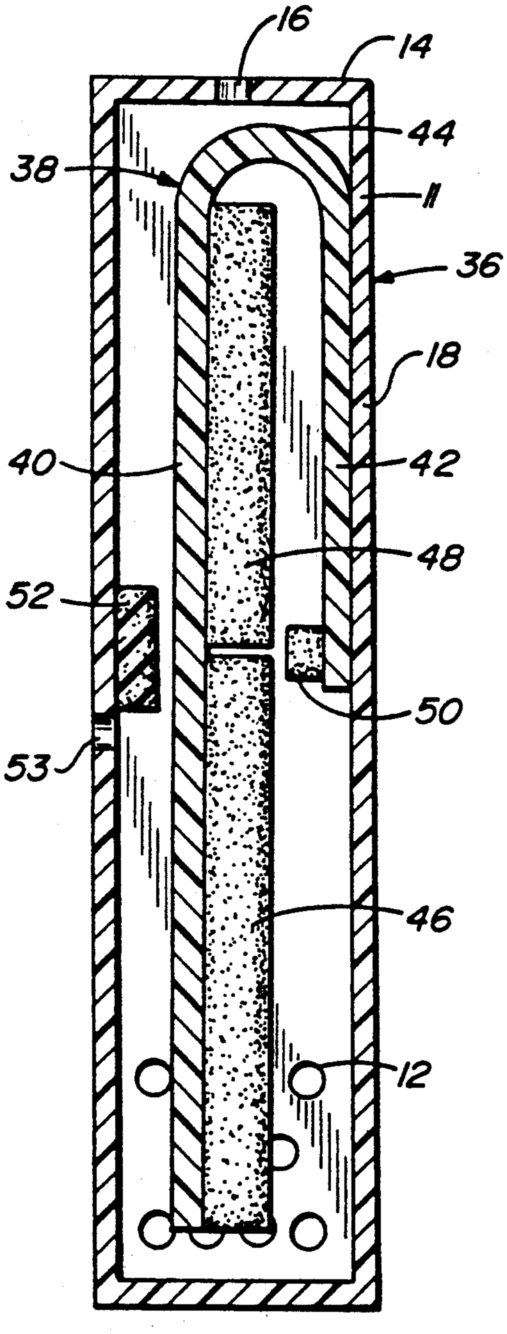
FIG. 3A is a cross-sectional view of another embodiment of this invention in its unactuated state and which utilizes a housing similar to that set forth in FIG. 1.

FIG. 3A illustrates in cross-section the interior of another embodiment of the present invention. In FIG. 3A, device 36 is in its unactuated state. Device 36 utilizes a housing similar to that of device 10; that is to say a housing 11 having ports 12 and a top wall 14 having port 16. Device 36 contains a compressible member 38 having two arms 40 and 42 attached to shoulder 44. Attached to the interior of arm 40 is a first piece of bibulous material 46 and a second piece of bibulous material 48. The first piece of bibulous material 46 and the second piece of bibulous material 48 are separated and therefore are in a non-capillary flow relationship to each other. Attached to the interior of arm 42 is a third piece of bibulous material 50 and attached to the interior of the wall adjacent to arm 40 is a liquid expandable piece of bibulous material 52. The position of arm 42 is preferably fixed within device 36 so that upon expansion of the liquid expandable piece of bibulous material, compressible member 38 will not move within device 36. this can be accomplished, for example, by fixing arm 42 to the side wall of device 36. Liquid expandable piece of bibulous material 52 is attached to the interior of the wall adjacent to arm 40 preferably at a point aligned with the third piece of bibulous material 50. The bottom of liquid expandable piece of bibulous material 52 can be indicated by a portal 53 or other mark on the exterior wall of device 36. Alternatively, liquid expandable piece of bibulous material 52 could be attached to exterior of arm 40 at a point aligned with the third piece of bibulous material 50.

Figure 3B:
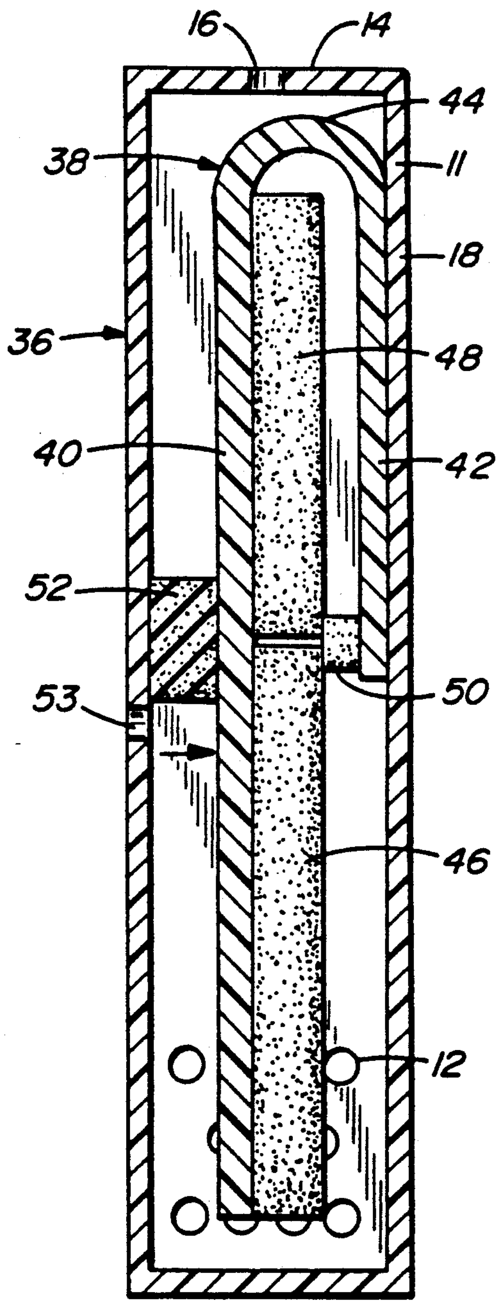
FIG. 3B is a cross-sectional view illustrating the device depicted in FIG. 3A in its actuated state.

FIG. 3B illustrates in cross-section the interior of device 36 in its actuated state. As shown in this figure, device 36 is actuated by expansion of the liquid expandable piece of bibulous material 52. When the liquid expandable piece of bibulous material 52 expands, the confinement of compressible member 38 in housing 11 results in compression of arm 40 against arm 42 through shoulder 44 which in turn results in the top portion of the first piece of bibulous material 46 contacting the bottom portion of the third piece of bibulous material 50 and the bottom portion of the second piece of bibulous material 48 contacting the top portion of the third piece of bibulous material 50 thereby creating a capillary flow relationship among these three pieces. Liquid expandable piece of bibulous material 52 is actuated by wetting which in turn can be accomplished by allowing the liquid level in device 36 to rise to the bottom of piece 52 as evidenced by portal 53 on the outside of housing 11. Alternatively, the liquid required to wet liquid expandable piece of bibulous material 52 can be applied through a port 53 which extends through the exterior of housing 11 to the liquid expandable piece of bibulous material 52. In a preferred embodiment, device 36 is placed in a liquid solution, generally an aqueous liquid solution, to a level no higher than the height of ports 12. The solution is allowed to traverse by capillarity the entire length of the first piece of bibulous material 46. Afterwards, when desired, device 36 can be placed in a second solution, generally an aqueous solution, and device 36 can either be lowered into the solution to a level equal to the bottom of the liquid expandable piece of bibulous material 52 which actuates this piece of bibulous material or device 36 can be placed in a second solution to a level no higher than the height of ports 12 and the requisite amount of liquid is applied to the liquid expandable piece of bibulous material 52 so as to result in expansion of this piece and completion of the fluidic circuit. In either case, upon completion of the fluidic circuit, a capillary flow relationship exists between the first, third and second pieces of bibulous material.

Figure 4:
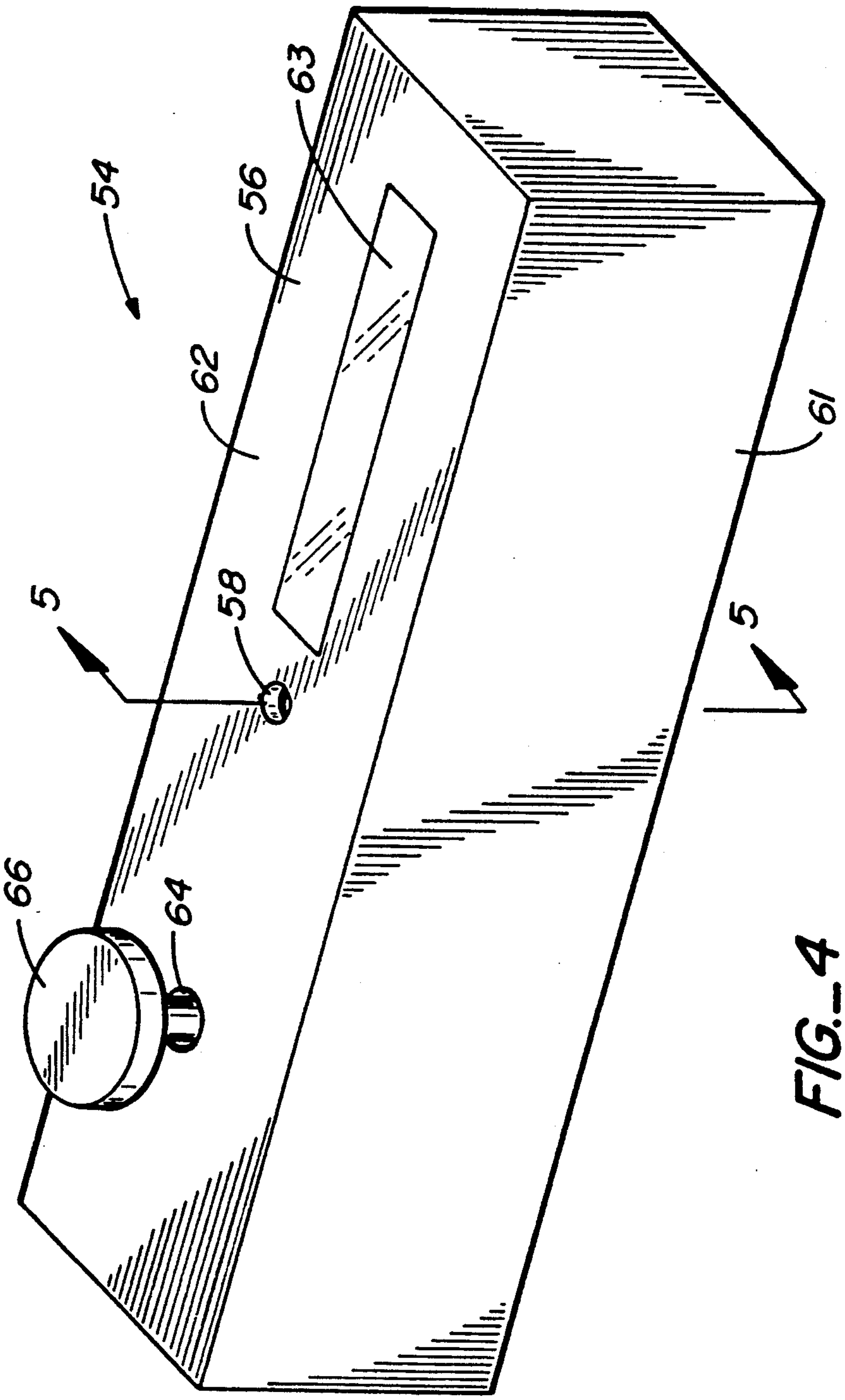
FIG. 4 is a perspective new of another embodiment of this invention.

FIG. 4 is a perspective view of another embodiment of this invention. In FIG. 4, device 54 is encased by housing 56 which in turn has port 58 which allows a liquid sample to be placed on first piece of bibulous material 60 (shown in FIGS. 5A and 5B). Device 54 has a front wall 61 and a top wall 62. Top wall 62 has opening 64 with plunger 66 movably confined therein, which can move under applied pressure downward in relationship to top wall 62.

Figure 5A:
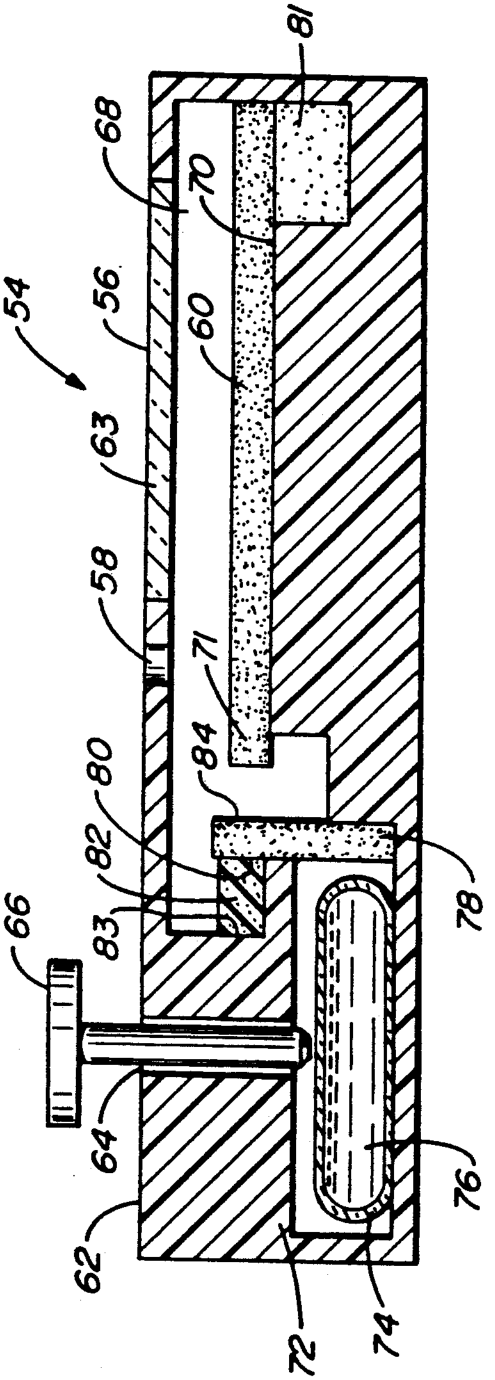
FIG. 5A is a cross-sectional view of the embodiment of FIG. 4 taken along lines 5—5 of FIG. 4 and illustrates this embodiment in its unactuated state.

FIG. 5A illustrates in cross-section the interior of device 54 in its unactuated state. Device 54 contains interior cavity 68 in which first piece of bibulous material 60 is confined on ledge 70. First piece of bibulous material 60 rests on ledge 70 and has protruding portion 71 which extends slightly beyond ledge 70. Interior cavity 68 includes a volume element 72 capable of holding a quantity of liquid. Within cavity 68 is breakable capsule 74 which contains liquid 76. Also within cavity 68 is second piece of bibulous material 78 which has portion 80 in fixed relationship with liquid expandable piece of bibulous material 82, which prior to actuation is preferably completely dry. Liquid expandable piece of bibulous material 82 is fixedly attached to interior wall 83 of housing 56. Second piece of bibulous material 78 has adjacent portion 84, which lies across from protruding portion 71.

Figure 5B:
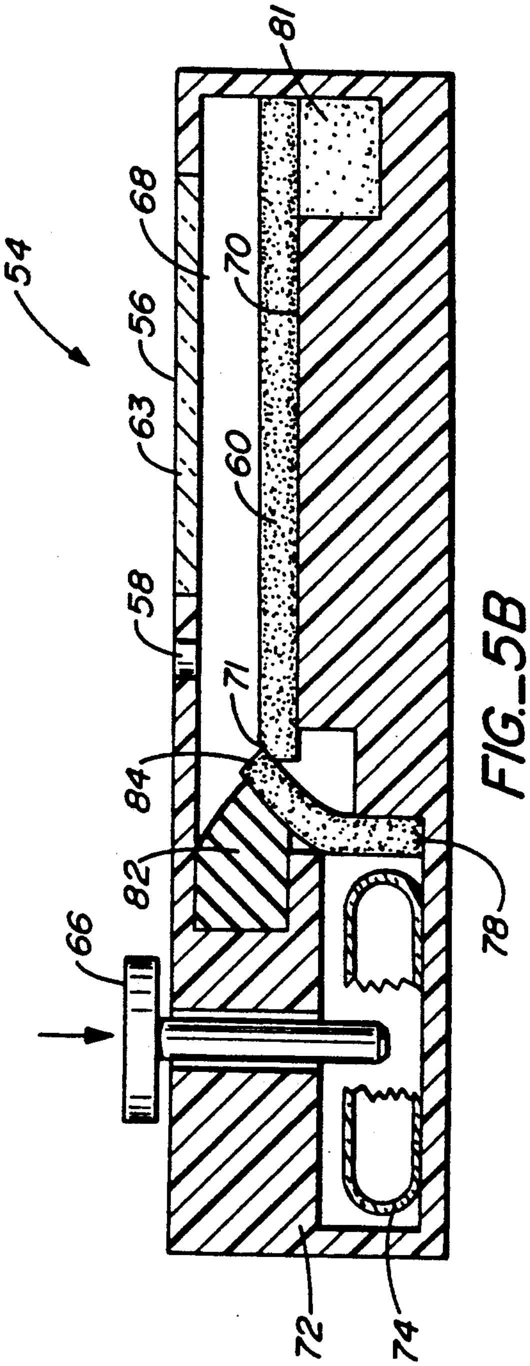
FIG. 5B is a cross-sectional view illustrating the device depicted in FIG. 5A in its actuated state.

FIG. 5B illustrates in cross-section the interior of device 54 in its actuated state. As shown in this figure, device 54 is actuated by the downward movement of plunger 66, which when moved downward fractures breakable capsule 74. Plunger 66 is moved downward by use of applied pressure such as that resulting from a thumb or finger pushing downward on plunger 66. Once breakable capsule 74 fractures, liquid 76 is released into volume element 72 and is then absorbed by second piece of bibulous material 78, on which the liquid traverses to liquid expandable piece of bibulous material 82, which is capable of expanding sufficiently to force adjacent portion 84 into contact with protruding portion 71. Breakable capsule 74 contains sufficient liquid 76 to ensure (a) that liquid expandable piece of bibulous material 82 will expand and force second piece of bibulous material 78 to contact bibulous material 60 thereby creating a capillary flow relationship between second piece of bibulous material 78 and bibulous material 60; and (b) liquid 76 will traverse by capillarity all or part of piece of bibulous material 60.

In operation, device 54 is utilized by first placing a liquid sample to be tested on bibulous material 60 which can be accomplished, for example, by inserting a syringe or pipette through port 58 and applying the requisite amount of sample. Alternatively, port 58 may be conical and extend downward to a point just above bibulous material 60 so that the sample will be directed to the appropriate point on the bibulous material 60. Preferably, port 58 is positioned at or very near the end of bibulous material 60 closest to protruding portion 71. Preferably, the amount of liquid sample should be sufficiently small such that the liquid sample wets a minimum amount of bibulous material 60, i.e., generally less than about 10–15% of the length of bibulous material 60 is wetted by said liquid sample. Alternatively, if a liquid absorbent pad (not shown) is used with bibulous material 60, greater quantities of liquid sample can be employed. Bibulous material 60 can have appropriate reagents bound at predetermined sites thereon.

See, for instance, Zuk et al, U.S. Pat. No. 4,435,504; Weng et al, U.S. Pat. No. 4,740,468; and Tom et al, U.S. Pat. No. 4,366,241, each of which is incorporated herein in their entirety by reference and wherein certain terms mentioned below are defined.

After application of liquid sample to piece of bibulous material 60, any additional liquid reagents or wash solution necessary or desirable in the assay or test can be added to bibulous material 60 in several ways. In one embodiment, some or all of the additional liquid reagents may be added via port 58 provided that the addition of such reagents does not result in the inability of bibulous material 60 to transport additional liquid by capillarity. If bibulous material 60 employs no absorbent pad, then such liquid reagents should wet no more than about 50% of the length of piece of bibulous material 60 and preferably no more than about 35%. If bibulous material 60 employs an absorbent pad, then the entire length of bibulous material 60 can be wetted provided that the absorbent pad it not saturated to the point where it can not absorb additional quantities of liquid.

At the appropriate time after addition of these liquid reagents, additional liquid reagents or a wash solution contained in the breakable capsule can be applied to the piece of bibulous material 60. This is accomplished by applying pressure on plunger 66, which fractures breakable capsule 74 thereby releasing liquid 76 containing the additional reagents or wash solution. Liquid 76 is confined in volume element 72, which allows it to contact and be absorbed by second piece of bibulous material 78 and ultimately liquid expandable piece of bibulous material 82, which upon expansion contacts bibulous material 60 thereby creating a capillary flow relationship between bibulous material 60 and second piece of bibulous material 78. Because bibulous material 60 can still transport liquid by capillary (either through the portion of bibulous material 60 which is still dry or through an absorbent pad), liquid 76 will move along bibulous material 60 by capillarity until either bibulous material 60 can no longer transport liquid by capillarity or capillary flow ceases when liquid 76 is exhausted. Preferably, when an absorbent pad 81 is employed, it is placed at the far end of bibulous material 60 (the end opposite liquid expandable piece of bibulous material 82). Absorbent pad 81 may be either an integral part of or in liquid contact with bibulous material 60.

In another embodiment, all of the reagents necessary to conduct the assay or test (other than the sample) are contained in breakable capsule 74. In this embodiment, after the liquid sample is applied to bibulous material 60, breakable capsule 74 is fractured in the same manner as set forth above which results in second piece of bibulous material 78 contacting bibulous material 60 thereby creating a capillary flow relationship between these two pieces.

In a preferred embodiment, top wall 62 of device 54 contains a means to view all or a portion of bibulous material 60. One means for viewing bibulous material 60 is by having an appropriate window 63 in top wall 62. Such a window can take the form of a glass or clear plastic encompassing all of top wall 62 or only that portion of top wall 62 which exposes the relevant portion of bibulous material 60. In this regard, many assays which utilize bibulous material have a small detection zone relative to the size of the bibulous material employed, which zone, upon completion of the assay, indicates the presence or absence of the material being tested for. Accordingly, in those circumstances, it is not necessary to view the entire length of bibulous material 60 but only necessary to view the detection zone. On the other hand, some assays require that the entire bibulous material be viewed in order to quantitatively determine the presence of analyte. The window can also take the form of an opening in top wall 62 which allows viewing of the relevant portion of bibulous material 60.

Figure 6A:
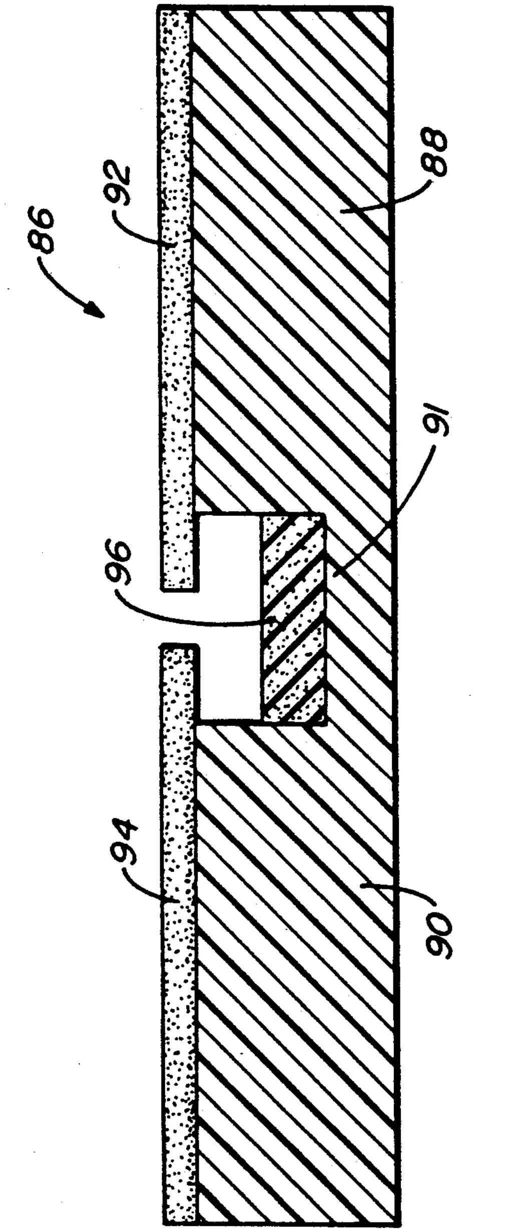
FIG. 6A is a cross-sectional view of another embodiment of this invention in its unactuated state.

FIG. 6A illustrates another embodiment of the present invention in its unactuated state. In FIG. 6A, device 86 contains bases 88 and 90 which are joined by bridge 91. On the top surfaces of bases 88 and 90 rest bibulous materials 92 and 94 respectively each of which extends beyond the edge of the top surface. Lastly, placed between bases 88 and 90 and on the top surface of bridge 91 is liquid expandable piece of bibulous material 96. Liquid expandable piece of bibulous material 96 is preferably completely dry and has sufficient expansion capacity that when wetted, it will contact both pieces of bibulous material 94 and 96. In its unactuated state, there is no capillary flow relationship between any of the pieces of bibulous material or the liquid expandable piece of bibulous material.

Figure 6B:
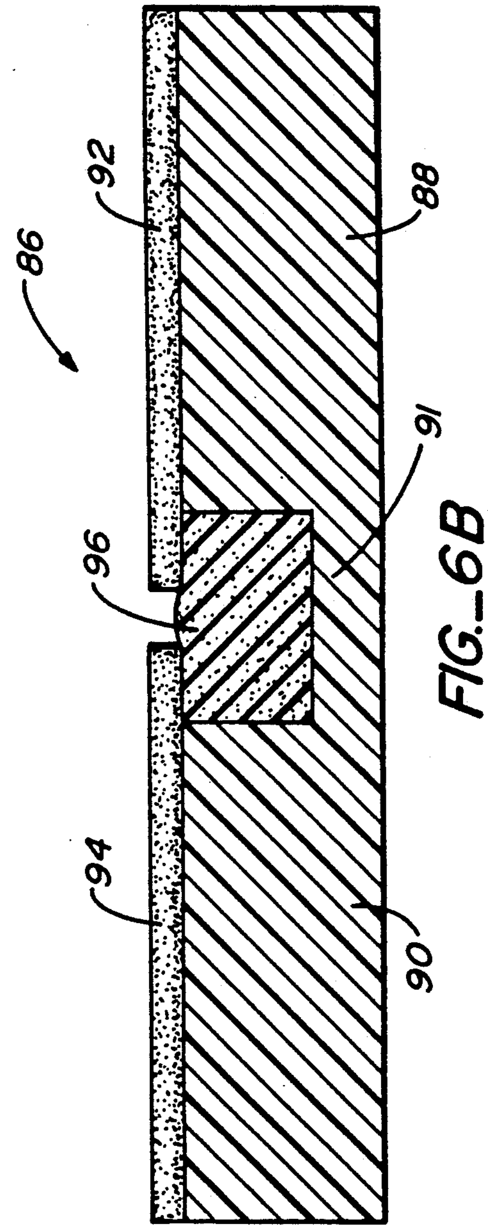
FIG. 6B is a cross-sectional view illustrating the device depicted in FIG. 6A in its actuated state.

FIG. 6B illustrates device 86 in its actuated state. In particular, device 86 is actuated by contacting liquid expandable piece of bibulous material 96 with a sufficient amount of liquid to cause liquid expandable piece of bibulous material 96 to expand upward and contact both pieces of bibulous material 94 and 96. A sufficient amount of liquid is generally added by a pipette, syringe, etc. or by use of a breakable capsule such as that depicted in FIGS. 5A and 5B above. Device 86 has particular utility when used in a housing similar to that set forth in FIGS. 5A and 5B. In such a housing, it is possible to conduct two assays simultaneously with the liquid expandable piece of bibulous material 96 providing the same liquid reagent to both pieces of bibulous material simultaneously.

Figure 7A:
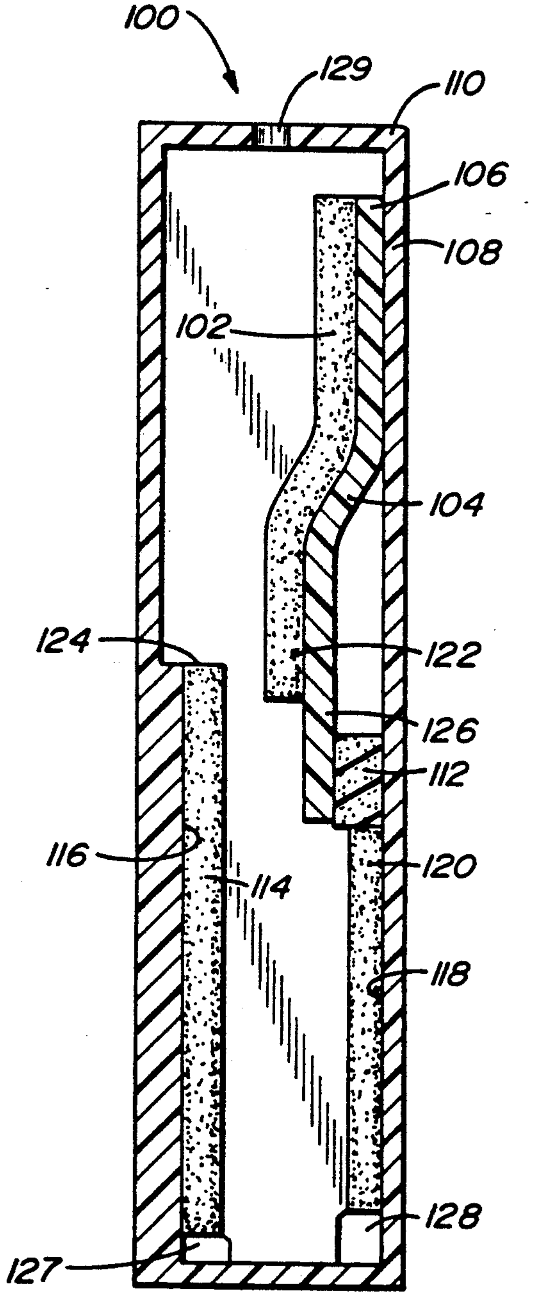
FIG. 7A is a cross-sectional view of another embodiment of this invention in its unactuated state.

FIG. 7A illustrates a cross-sectional view of the interior of another embodiment of a device in accordance with the present invention. Device 100 contains first piece of bibulous material 102 fixedly attached to nonporous member 104. The upper portion 106 of member 104 is fixedly attached to wall 108 of housing 110. Member 104 is preferably fixed within device 100 so that upon expansion of the liquid expandable piece of bibulous material 112, first piece of bibulous material 102 moves into contact with second piece of bibulous material 114 fixedly attached to the interior of wall 116 of housing 110. Attached to the interior surface 118 of wall 108 of housing 110 is third piece of bibulous material 120. First and second pieces of bibulous material 102 and 114 have adjacent portions 122 and 124, respectively. Attached to the interior surface 118 is liquid expandable piece of bibulous material 112. Liquid expandable piece of bibulous material 112 is also attached to member 104 at portion 126. Housing 110 has port 127 generally aligned with second piece of bibulous material 114. Housing 110 also has port 128 generally aligned with third piece of bibulous material 120. Housing 110 has port 129 to allow air to escape from the interior of housing 110 as liquid enters through ports 127 and or 128.

Figure 7B:
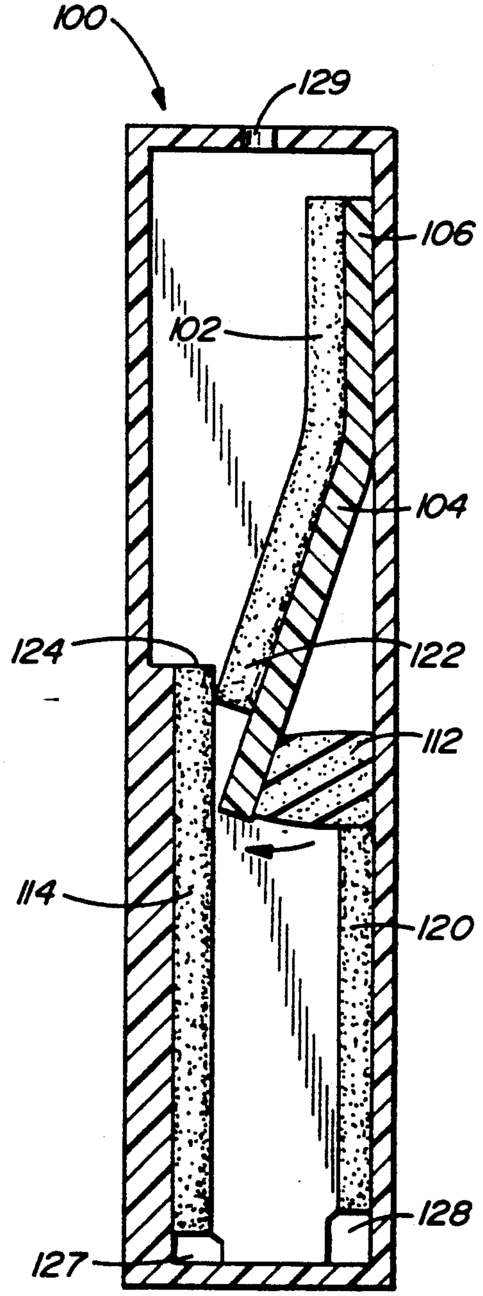
FIG. 7B is a cross-sectional view illustrating the device depicted in FIG. 7A in its actuated state.

FIG. 7B illustrates in cross-section the interior of device 100 in its actuated state. As shown in this figure, device 100 is actuated by expansion of the liquid expandable piece of bibulous material 112. When the liquid expandable piece of bibulous material 112 expands, membrane 106 is forced in the direction of second piece of bibulous material 114 and results in adjacent portion 122 of first piece of bibulous material 102 contacting adjacent portion 124 of second piece of bibulous material 114, thereby creating a capillary flow relationship between these two pieces. Liquid expandable piece of bibulous material 112 is actuated by wetting, which is accomplished by allowing liquid to enter port 128 and to traverse by capillarity third piece of bibulous material 120. In a preferred embodiment, device 100 is placed in a liquid solution, generally an aqueous liquid solution, to a level no higher than the height of port 127. The solution is allowed to traverse by capillarity the entire length of second piece of bibulous material 114. Afterwards, when desired, device 100 can be placed in a second solution, generally an aqueous solution, to a level at least as high as the height of port 128. The liquid traverses third piece of bibulous material 120, which then actuates liquid expandable piece of bibulous material 112, which in turn forces piece 102 into contact with piece 114 resulting in completion of a fluidic circuit. Upon completion of the fluidic circuit, a capillary flow relationship exists between the first and second pieces of bibulous material, 102 and 114, respectively.

Figure 8A:
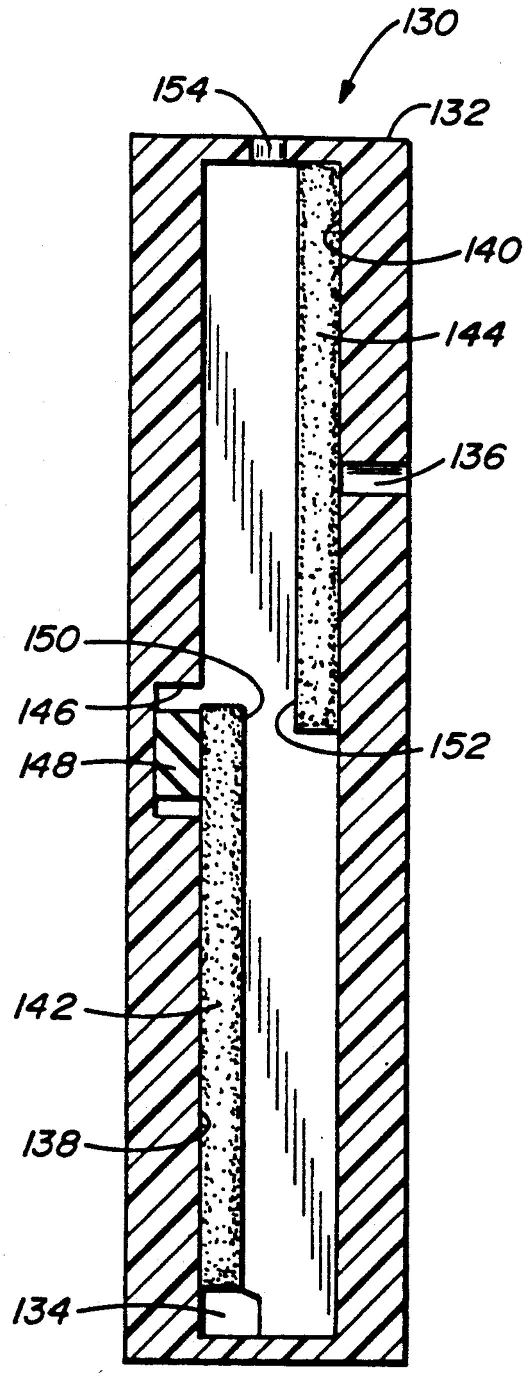
FIG. 8A is a cross-sectional view of another embodiment of this invention in its unactuated state.

FIG. 8A illustrates in cross-section the interior of another embodiment of the present invention. In FIG. 8A, device 130 is in its unactuated state. Device 130 utilizes a housing 132 having ports 134 and 136. Attached to the interior walls 138 and 140, respectively, are first piece of bibulous material 142 and second piece of bibulous material 144. The first piece of bibulous material 142 and the second piece of bibulous material 144 are separated and therefore are in a non-capillary flow relationship to each other. Attached to the interior of housing 132 in recess 146 is a liquid expandable piece of bibulous material 148. First piece of bibulous material 142 has adjacent portion 150 and second piece of bibulous material 144 has adjacent portion 152 so that upon expansion of the liquid expandable piece of bibulous material, portions 150 and 152 will be brought into contact. Liquid expandable piece of bibulous material 148 is attached to first piece of bibulous material 142 at a point aligned with adjacent portion 150. Housing 132 has top port 154.

Figure 8B:
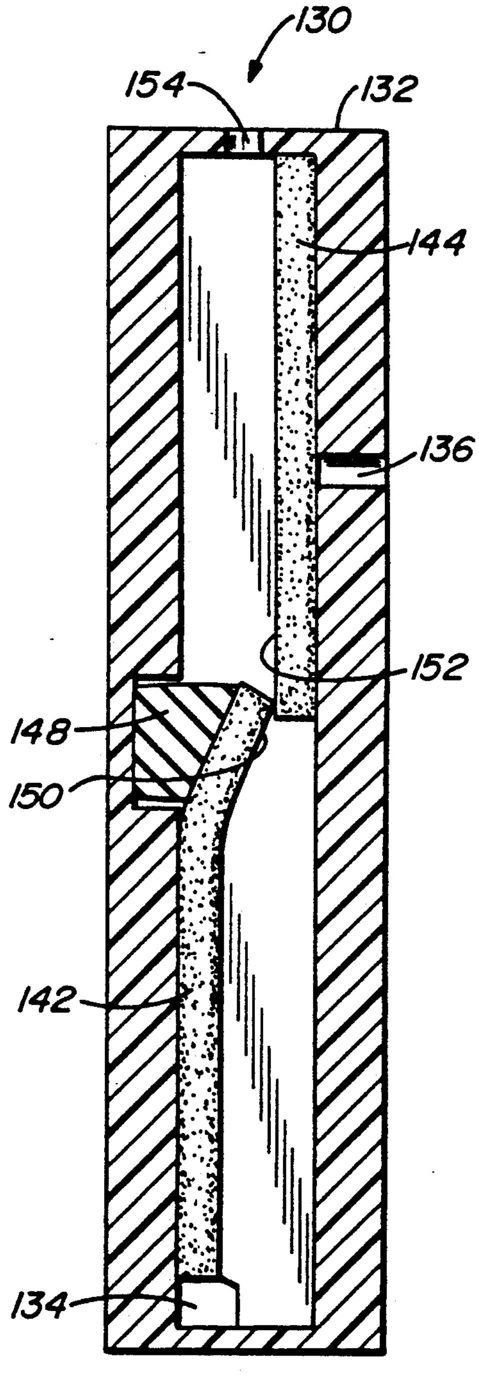
FIG. 8B is a cross-sectional view illustrating the device depicted in FIG. 8A in its actuated state.

FIG. 8B illustrates in cross-section the interior of device 130 in its actuated state. As shown in this figure, device 130 is actuated by expansion of the liquid expandable piece of bibulous material 148. When the liquid expandable piece of bibulous material 148 expands, adjacent portion of the first piece of bibulous material 142 contacts adjacent portion of second piece of bibulous material 144 thereby creating a capillary flow relationship. Liquid expandable piece of bibulous material 148 is actuated by wetting, which can be accomplished by allowing liquid to traverse first piece of bibulous material 142 to reach liquid expandable piece of bibulous material 148. This can be accomplished by placing device 130 into a liquid at least up to a level of the height of port 134. Additional liquid can be applied through port 134. Alternatively, additional liquid can be applied through port 136 once the fluidic circuit has been established. Alternatively, liquid can be applied to second piece 144 through port 136 prior to completion of the fluidic circuit. In any event upon completion of the fluidic circuit, a capillary flow relationship exists between the first and second pieces of bibulous material.

Figure 9A:
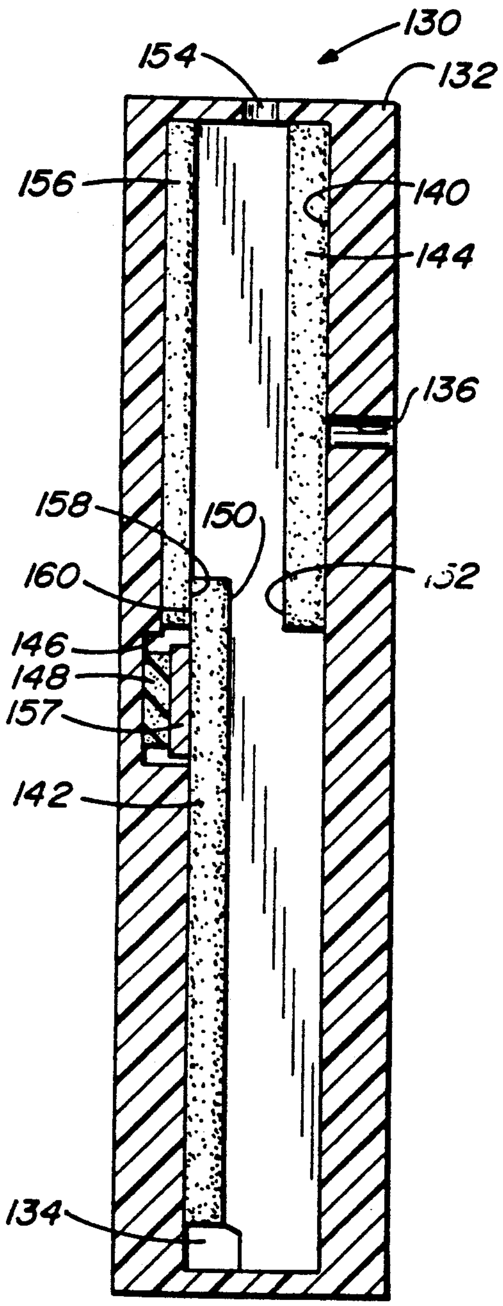
FIG. 9A is a cross-sectional view of another embodiment of this invention in its unactuated state.

FIG. 9A illustrates in cross-section the interior of another embodiment of the present invention. This embodiment is based on the embodiment of FIG. 8A and includes the additional feature of third piece of bibulous material 156 fixedly attached to wall 138 of housing 132. Third piece of bibulous material 156 has adjacent portion 158 which contacts adjacent portion 160 of first piece of bibulous material 142 when device 130 is in an non-actuated state. First piece of bibulous material 142 has membrane 157 between piece 142 and liquid expandable piece 148. Membrane 157 has flow resistant properties to provide for controlling the rate of flow of liquid therethrough and into liquid expandable piece 148.

Figure 9B:
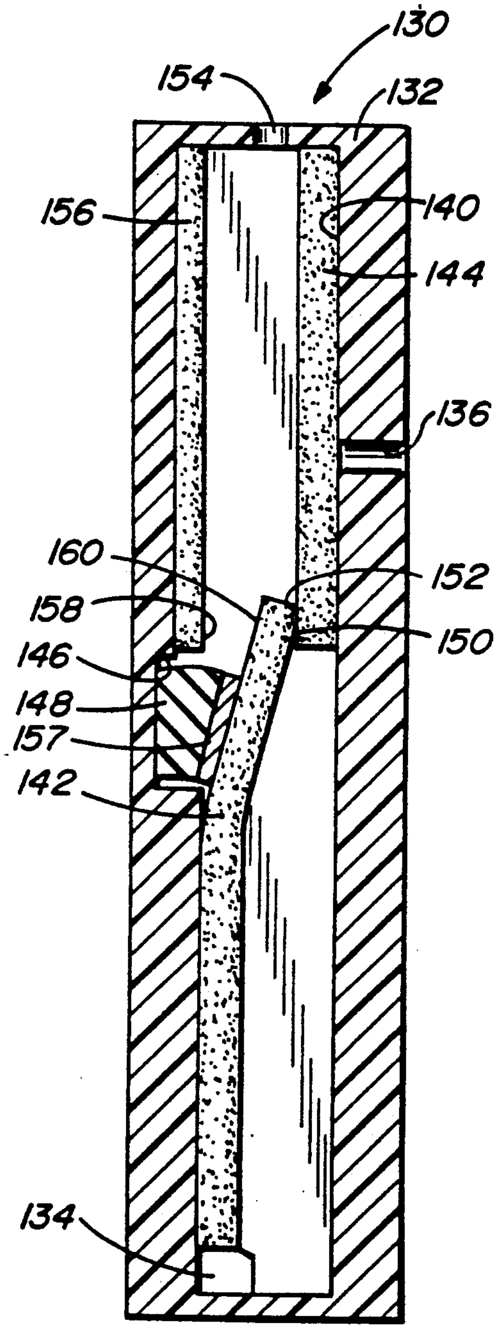
FIG. 9B is a cross-sectional view illustrating the device depicted in FIG. 9A in its actuated state.

FIG. 9B illustrates in cross-section the interior of device 130 in its actuated state. As shown in this figure, device 130 is actuated in a manner similar to that described for the device in FIG. 8B. In the embodiment of FIG. 9B third piece of bibulous material 156 acts to absorb additional liquid, thus providing for more liquid to traverse first piece of bibulous material 142 than would otherwise be possible with the device of FIG. 8B. When liquid expandable piece of bibulous material 148 expands sufficiently by virtue of liquid received through membrane 157, contact between adjacent portions 158 and 160, respectively, is broken thereby terminating the capillary flow relationship between first and third pieces of bibulous material, 142 and 156, respectively. Upon further expansion of liquid expandable piece 148, adjacent portion 150 contacts adjacent portion 152 thereby creating a fluidic circuit, and thus initiating a capillary flow relationship, between first piece of bibulous material 142 and third piece of bibulous material 144.

The extent of capillary flow along first piece of bibulous material 142 and into third piece of bibulous material 156 is governed by the flow of liquid through membrane 157 and into liquid expandable piece of bibulous material 146. In particular, the more flow resistant membrane 157 is, the longer the time for liquid to pass through to liquid expandable piece of bibulous material 148, and the further capillary flow will continue on third piece of bibulous material 156 prior to actuation of the liquid expandable piece of bibulous material 148. Accordingly, merely by selecting membrane 157 of appropriate flow characteristics, one can control the extent of capillary migration along first piece of bibulous material 142 and thus control the amount of liquid taken up by first piece of bibulous material 84.

Referring to FIGS. 9A and 9B, in carrying out an assay for an analyte one protocol can involve forming a combination in an aqueous medium of the sample suspected of containing the analyte and a first reagent. The sample may be derived from a wide variety of sources, such as physiologic fluids, illustrated by saliva, blood, serum, plasma, urine, ocular lens fluid, spinal fluid, etc., food products such as milk and wine, chemical processing streams, food waste water, etc.

The portion of first piece of bibulous material 142 adjacent port 134 is contacted with a first liquid assay medium usually by dipping of the device at least to a height of that of port 134. However, contact of first piece 142 with the first liquid assay medium or solution can be carried out by other techniques such as by applying, with a pipette, for example, the first liquid medium to first piece 142 through port 134. Wetting of first piece of bibulous material 142 continues until a defined volume of medium has traversed the bibulous member. Commonly, at least 20 $\mu$L, usually at least 50 $\mu$L, frequently at least 100 $\mu$L, of the first liquid assay medium will traverse the bibulous member. The upward limit of first liquid assay medium traversing the bibulous member is generally determined by practical considerations such as the size of the device, and the like.

As a practical matter, relatively short times are desired for the first liquid assay medium to traverse the first piece of bibulous. Usually, the traverse of the first liquid assay medium over the first piece bibulous material 142 will take at least 30 sec and not more than 1 hour, more usually from about 1 min to 30 minutes, but periods as long as 24 hours can be used.

After the first liquid assay medium has traversed the first piece of bibulous material 142 and at least a portion of third piece of bibulous material 156, liquid expandable piece of bibulous material 148 expands sufficiently to terminate the capillary flow relationship between pieces 142 and 146 and ultimately piece 142 is brought into capillary flow relationship with second piece of bibulous material 144. Preferably, the capillary flow relationship between the first piece of bibulous material 142 and the third piece of bibulous material 156 is terminated prior to institution of the capillary flow relationship between second piece of bibulous material 144 and a second liquid assay medium.

A portion of the second piece of bibulous material can be contacted with other liquid, usually aqueous, reagents through port 136 or port 134. If the liquid reagent is added through port 134 the second medium traverses the first piece of bibulous material 142 and at least a portion of the second piece of bibulous material 144 capillary action. Components in the subsequently applied liquid reagents can become non-diffusively bound to the second piece of bibulous material 144 in relation to the presence of analyte in the sample or the first medium. Second piece of bibulous material 144 may have bound to it a detection agent in a specific zone or on all of second piece 144.

Such assay methods can provide either a qualitative or a quantitative determination of an analyte.

In view of the above, it is apparent that devices of the present invention allow the creation of a capillary flow relationship between two or more pieces of bibulous material which heretofore were in a non-capillary flow relationship. Such devices have the particular advantage of allowing the device operator to choose the time to actuate the device and thus create the capillary flow relationship.

The housing used in the devices of the present invention as well as the bases and protrusions can be prepared from non-corrosive materials which do not readily degrade or disintegrate upon exposure to the solutions employed in the assay. Additionally, such materials should not interfere with the assay being conducted. In general, metals, metal alloys, glass and rigid and semirigid plastic can be used. Preferably, a rigid or a semirigid plastic is employed. As used herein, the term "non-corrosive" means that the material is not subject to undo decomposition or disintegration when routinely used in the devices of the present invention.

The dimensions of the devices of the present invention can vary depending on the particular use, that is, whether the devices are used in immunoassays, etc. For example, the length of any particular piece of bibulous material employed in a device of the present invention can be varied considerably depending upon factors such as whether an absorbent pad is employed, the amount of liquid required to be taken up by the assay, whether a wash solution is required or desired for the assay, etc. Likewise, the extent of expansion of the liquid expandable piece of bibulous material depends on factors such as the space between the two pieces of bibulous material 32 and 34 depicted in FIG. 2A, the space between piece of bibulous material 60 and liquid expandable piece of bibulous material 82 depict in FIG. 5A, etc. Those skilled in the art will be able to construct devices of the present invention having appropriate dimensions in view of the disclosure herein.

To enhance the versatility of the subject invention, the device can be provided in a kit in packaged combination with a liquid medium and other compounds, in the same or separate containers as the inter-reactivity of the components permits. For conducting an assay the kit can further include other separately packaged reagents for conducting an assay including members of a signal producing system, antibodies either labeled or unlabeled, supports, ancillary reagents, and so forth. Reagents can be provided so that the ratio of the reagents provides for substantial optimization of the method and assay.

Having described several embodiments of a device of the present invention, it is to be understood that various changes in form and detail may be made therein without departing from the scope and spirit of this invention.

What is claimed is:

1. A method for creating a capillary flow relationship between two or more pieces of bibulous material which prior to actuation are in a non-capillary flow relationship to each other which comprises:

(a) providing a device which comprises (i) two or more pieces of bibulous material in a non-capillary flow relationship to each other; (ii) a liquid expandable piece of bibulous material which is constructed and positioned so as to expand by wetting resulting in two of said pieces of bibulous material directly physically contacting one another and initiating a capillary flow relationship between said two or more pieces of bibulous material with the proviso that said liquid expandable piece of bibulous material is not one of said pieces of bibulous material of (i) above; and (b) contacting said liquid expandable piece of bibulous material with a sufficient quantity of a liquid to wet said liquid expandable piece of bibulous material.

2. The method according to claim 1 wherein said two or more pieces of bibulous material are paper strips.

3. A device for permitting capillary flow of a liquid between two or more pieces of bibulous material which prior to actuation are in a non-capillary flow relationship to each other which comprises:

(a) a liquid expandable piece of bibulous material; and (b) two or more pieces of bibulous material in a non-capillary flow relationship to each other with the proviso that none of said pieces of bibulous material is said liquid expandable piece of bibulous material of (a) above, wherein said liquid expandable piece of bibulous material is constructed and positioned so as to expand when wetted which thereby results in two of said pieces of bibulous material directly physically contacting one another in such a manner so as to achieve a capillary flow relationship between said two or more pieces.

4. The device according to claim 3 wherein said two or more pieces of bibulous material are paper strips.

* * * * *